(12) United States Patent
Strege (10) Patent No.: US 11,614,380 B2
(45) Date of Patent: Mar. 28, 2023

(54) SYSTEM AND METHOD FOR ACQUISITION OF TIRE SIDEWALL DATA FROM A MOVING VEHICLE

(71) Applicant: Hunter Engineering Company, Bridgeton, MO (US)

(72) Inventor: Timothy A. Strege, Sunset Hills, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 318 days.

(21) Appl. No.: 16/916,007

(22) Filed: Jun. 29, 2020

(65) Prior Publication Data

US 2021/0003481 A1  Jan. 7, 2021

Related U.S. Application Data

(60) Provisional application No. 62/869,860, filed on Jul. 2, 2019.

(51) Int. Cl.
*B60C 11/24* (2006.01)
*B60C 25/00* (2006.01)
(Continued)

(52) U.S. Cl.
CPC ......... *G01M 17/027* (2013.01); *B60C 11/246* (2013.01); *B60C 13/001* (2013.01);
(Continued)

(58) Field of Classification Search
CPC .. G01M 17/027; B60C 11/246; B60C 13/001; B60C 25/007; G06K 7/1417;
(Continued)

(56) References Cited

U.S. PATENT DOCUMENTS 9,025,853 B2  5/2015  Noyel et al.
9,110,032 B2  8/2015  Farley, III et al.
(Continued)

FOREIGN PATENT DOCUMENTS

EP       3269569 B1      5/2019
WO    WO-2020121306 A1 *  6/2020  ........... G06K 9/3258

*Primary Examiner* — Russell Frejd
*Assistant Examiner* — Ana D Thomas
(74) *Attorney, Agent, or Firm* — Sandberg Phoenix & von Gontard PC (57) ABSTRACT

A drive-through vehicle inspection system acquiring information from engraved markings on the tire sidewalls of a moving vehicle. Optical imaging sensors disposed on opposite sides of the vehicle acquire images of the sidewall surfaces for each passing wheel assembly. The acquired images are evaluated by a processing system configured to identify, within the acquired images, visible markings engraved into the tire sidewall surfaces which include at first portion having a first optical reflectivity, and a second portion having a second optical reflectivity which is different from the first optical reflectivity. Each identified marking is decoded to retrieve data stored therein, representative of the tire, wheel assembly, and/or associated vehicle onto which the wheel assembly is installed. The retrieved data is incorporated into an inspection report and/or utilized by the vehicle inspection system to access vehicle-specific information contained within an indexed database.

17 Claims, 9 Drawing Sheets

(51) Int. Cl.
    *G06K 7/14*     (2006.01)
    *G07C 5/00*     (2006.01)
    *B60C 13/00*     (2006.01)
    *G01M 17/02*     (2006.01)
    *G07C 5/08*     (2006.01)

(52) U.S. Cl.
    CPC .......... *B60C 25/007* (2013.01); *G06K 7/1417* (2013.01); *G07C 5/008* (2013.01); *G07C 5/0808* (2013.01); *G07C 5/0841* (2013.01)

(58) Field of Classification Search
    CPC .... G07C 5/008; G07C 5/0808; G07C 5/0841; B29D 2030/726; G01B 11/2755; G01B 2210/30
    See application file for complete search history.

(56) References Cited

U.S. PATENT DOCUMENTS

| | | |
|---|---|---|
| 9,677,973 B1 | 6/2017 | Carroll et al. |
| 10,222,455 B1 | 3/2019 | Stieff et al. |
| 10,313,574 B2 | 6/2019 | Hanel et al. |
| 2017/0011666 A1 | 1/2017 | Kraus |
| 2017/0124784 A1* | 5/2017 | Wittmann ................. G06T 7/60 |
| 2018/0015795 A1 | 1/2018 | Azzari et al. |
| 2018/0299352 A1 | 10/2018 | Rose et al. |
| 2018/0313722 A1 | 11/2018 | Stieff |
| 2021/0039448 A1* | 2/2021 | Hoshiba ................. B60C 13/001 |
| 2021/0197630 A1 | 7/2021 | Corghi |

\* cited by examiner

SYSTEM AND METHOD FOR ACQUISITION OF TIRE SIDEWALL DATA FROM A MOVING VEHICLE

CROSS-REFERENCE TO RELATED APPLICATIONS

The present application is related to, and claims priority from, U.S. Provisional Patent Application Ser. No. 62/869,860 filed on Jul. 2, 2019, and which is herein incorporated by reference.

STATEMENT REGARDING FEDERALLY SPONSORED RESEARCH

Not Applicable.

BACKGROUND OF THE INVENTION

The present application is related to vehicle inspection systems, and in particular to an apparatus and method for acquiring data from tire sidewall markings on the wheel assemblies of a moving vehicle passing through a vehicle inspection system, from which information unique to each wheel assembly and/or vehicle is identified.

During manufacture, vehicle tires are typically marked with identifying information on the sidewall surfaces by either embossed or raised alpha-numeric characters and/or symbols. Embossed or raised markings are integrated into the mold from which the tire is produced, and are not typically unique to each individual tire. Rather, the embossed or raised markings are representative of tire characteristics (dimensions, load index, speed rating, etc.), manufacture identifying information, or tire batch required DOT codes. As such, the embossed or raised markings generally do not encode any unique tire, wheel assembly, or vehicle identifying information.

Figure 1:
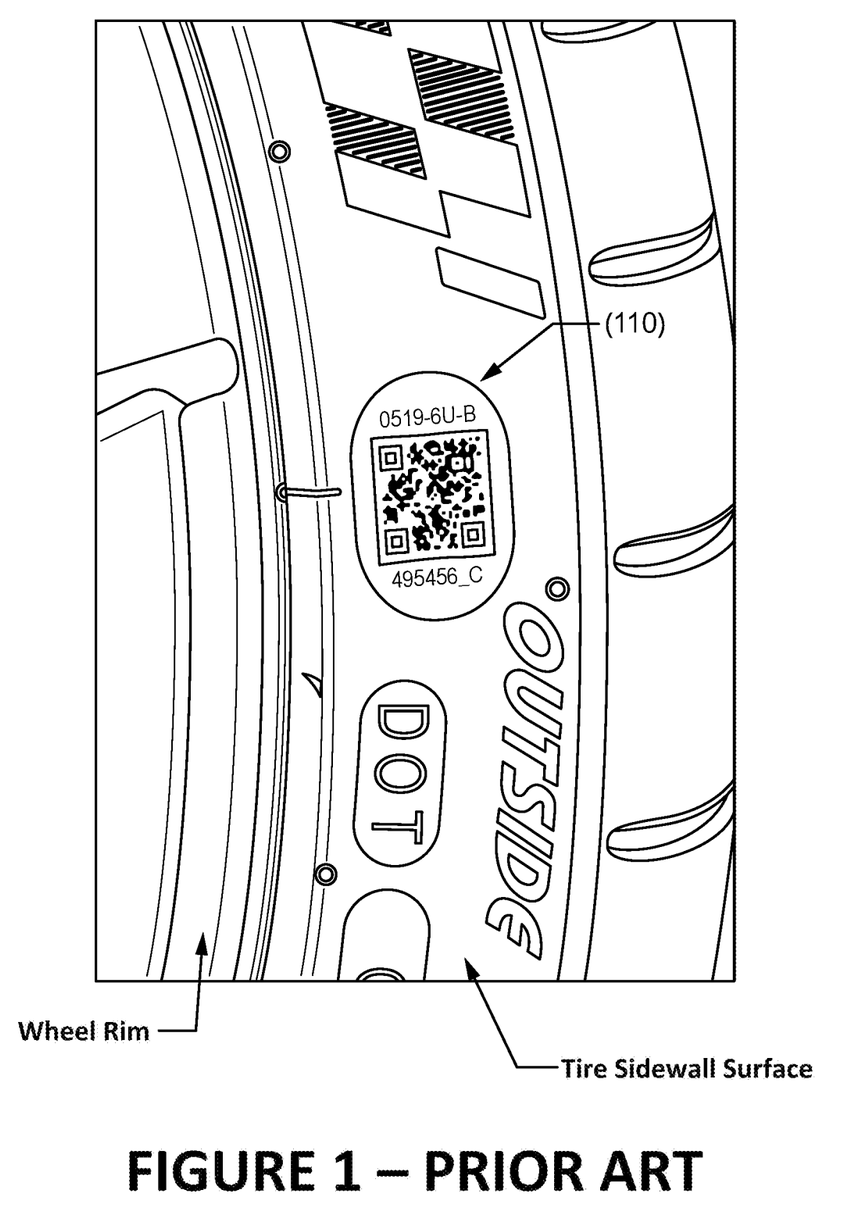
FIG. 1 is a prior art photograph of an engraved two-dimensional code on a tire sidewall.

Laser marking systems, such as provided by 4JET Technologies GmbH of Alsdorf, Germany and shown in U.S. Published Patent Application Serial No. 2017/0011666 A1 to Kraus are capable of providing individual tires with unique markings, such as one-dimensional (1D) barcodes or two-dimensional (2D) codes. Laser markings on tire sidewall surfaces are engraved directly into the rubber surface by vaporization of the rubber upon exposure to focused laser light, thereby forming regions having different reflectivity, such as shown in FIG. 1. An advantage of a laser marking system is that the engraving on the tire surface is carried out after the tire has been manufactured, such as at the time the tire is assembled onto a wheel rim, or at the time a set of wheel assemblies are mounted on a new vehicle. The engraved codes may incorporate detailed information uniquely identifying the tire and/or wheel assembly, the DOT code, vehicle identifying information, wheel assembly information, and/or any other relevant information which the operator chooses to encode at the time of engraving. When a vehicle is stationary or undergoing a service procedure, images of engraved codes can be easily captured using a smart phone camera or handheld optical imaging system. Similarly, imaging systems incorporated into a wheel service equipment such as wheel balancers or tire changers can acquire images of the engraved codes from individual tires or wheel assemblies under controlled positioning and illumination conditions.

Figure 3:
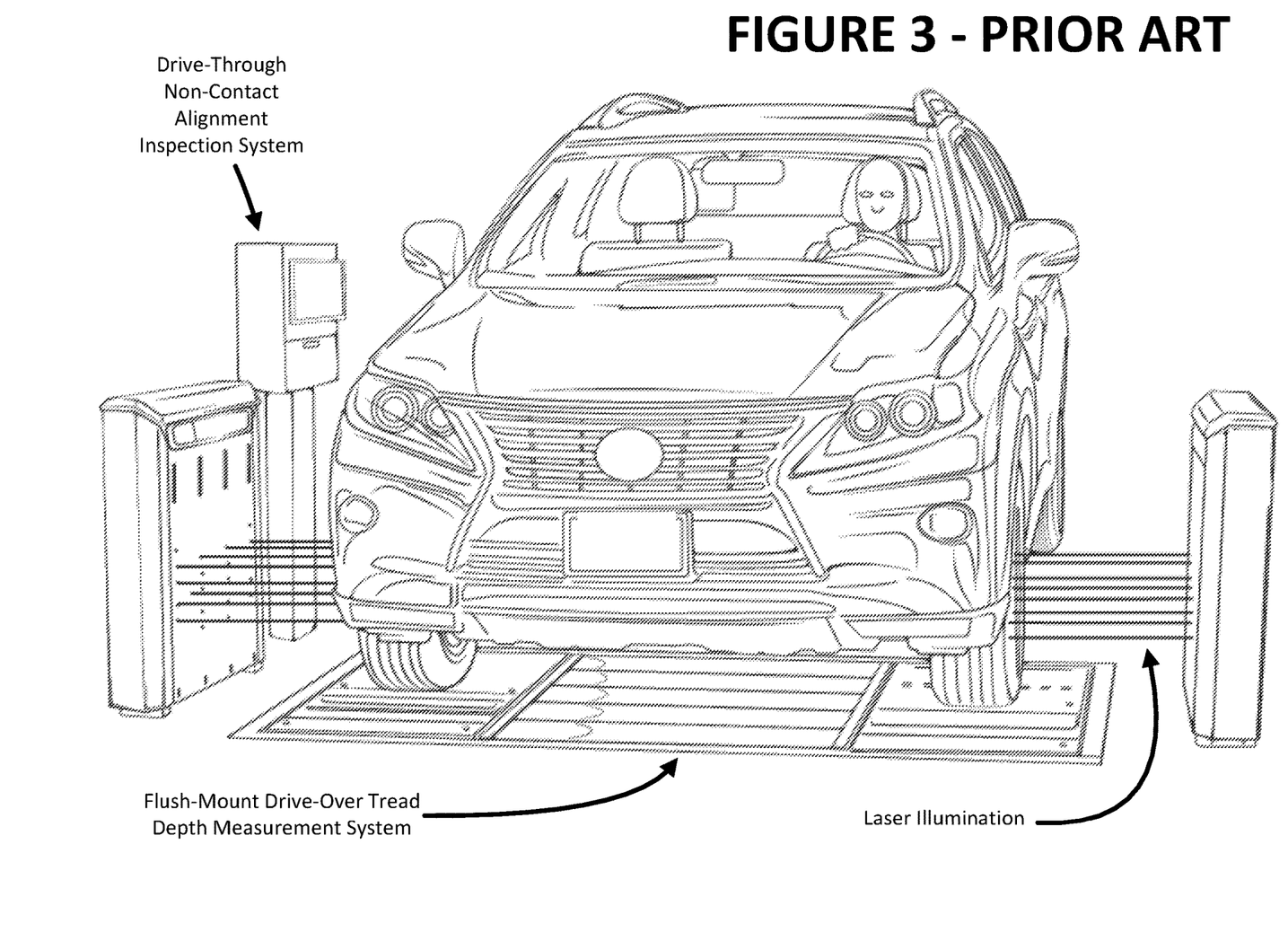
FIG. 3 is a prior art illustration of a vehicle passing through a drive-through alignment inspection system.
Figure 4:
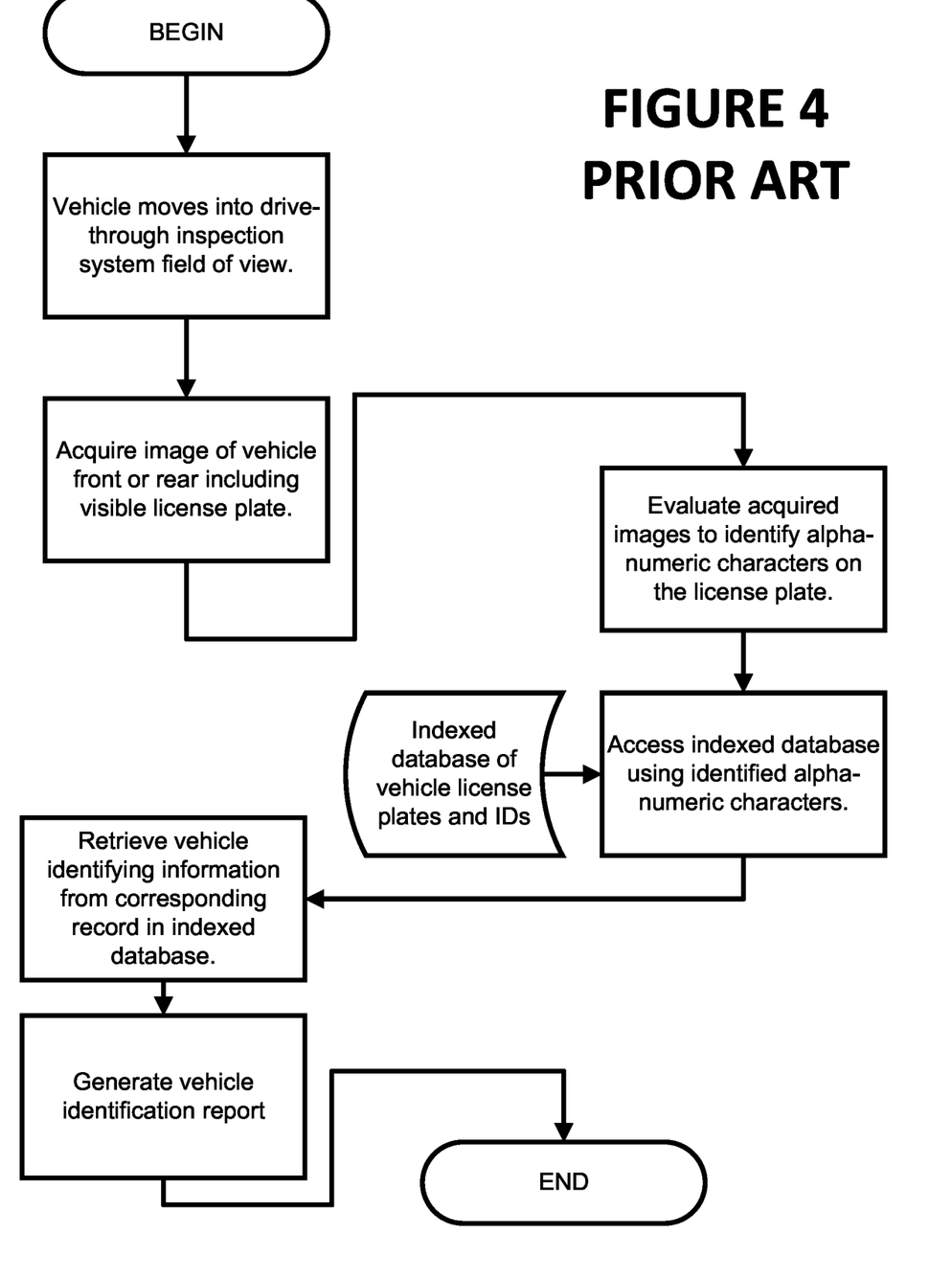
FIG. 4 is a flow diagram representative of prior art license plate recognition and vehicle identification procedures.

When a vehicle drives through a vehicle inspection system, such as a tire tread depth measurement system (FIG. 2), or a wheel alignment audit system (FIG. 3), identification of the vehicle in motion enables the system to recall relevant vehicle specifications and provide vehicle-specific results reporting. FIG. 4 illustrates the steps in a common method for the identification of a vehicle in motion. An image of the vehicle front or rear surface, including a visible license plate, is captured as the vehicle passes through the field of view of the inspection system. The image is processed to identify the associated alpha-numeric characters comprising the presumably unique license plate, which are then applied to a database of vehicle identifying information indexed by license plates. If matching license plate information is present in the indexed database, the corresponding identifying data for the vehicle is retrieved and used to generate a vehicle inspection report. Information retrieved from the indexed database may be limited to basic vehicle parameters, such as make, model, and year of manufacture, and may not include relevant details such as the vehicle's trim level or wheel rim and tire dimensions. However, such information, together with current vehicle identifying information, may be encoded into codes engraved onto the sidewalls of the tires installed on the vehicle by either the vehicle manufacturer or an aftermarket tire installation shop.

Accordingly, it would be advantageous to provide a drive-through vehicle inspection system, such as a tire tread depth measurement system or a vehicle wheel alignment audit system, with a method and apparatus for capturing information from codes engraved into the surfaces of tire sidewalls as a vehicle moves through the inspection system.

BRIEF SUMMARY OF THE INVENTION

Briefly stated, the present invention provides a drive-through vehicle inspection system with a method for acquiring information from markings engraved on tire sidewall surfaces, such as one-dimensional barcodes or two-dimensional codes, as a vehicle moves through the inspection system. As the vehicle passes through the inspection system, optical imaging sensors disposed on opposite sides of the vehicle each acquire images for each passing wheel assembly of the associated tire sidewall surfaces. The acquired images are evaluated by a processing system configured to identify, within the acquired images, visible markings engraved into the tire sidewall surfaces which include at first portion having a first optical reflectivity, and a second portion having a second optical reflectivity which is different from the first optical reflectivity. Each identified engraved marking is decoded by the processing system to retrieve data encoded therein, representative of the tire, wheel assembly, and/or associated vehicle onto which the wheel assembly is installed. The retrieved data is incorporated by the processing system into an inspection report and/or utilized to access vehicle-specific information contained within an indexed database.

In one embodiment, the set of optical imaging sensors acquires a sequence of images of each passing wheel assembly on a vehicle, such that for each wheel assembly, substantially all of the associated tire outside sidewall surface is captured within the sequence of images.

In another embodiment, the set of optical imaging sensors are triggered by the position of a passing wheel assembly to acquire an associated single image of the wheel assembly, encompassing substantially all of the outside tire sidewall surface.

In a further embodiment, supplemental illumination of the tire sidewall surfaces is provided as each image of the tire sidewall surfaces is acquired by the optical imaging sensor.

In yet another embodiment, the present invention incorporates an optical imaging system into a drive-through vehicle inspection system to acquire information from tire sidewall markings such as one-dimensional barcodes or two-dimensional codes engraved into tire sidewall surfaces of a vehicle moving through the inspection system. The optical imaging system includes at least one optical imaging sensor positioned to acquire images of the tire outer sidewall surface of each passing wheel assembly. A processing system is operatively coupled to the optical imaging system to receive image data, and is configured to identify, within the acquired images, engraved markings on the tire sidewall surfaces defined by surface regions of different reflectivity. The processing system is further configured to decode each identified marking to retrieve data encoded therein, representative of a unique identifier, the tire, wheel assembly, and/or associated vehicle onto which the wheel assembly is installed. The retrieved data is incorporated into an inspection report and/or utilized by the processing system to access vehicle-specific information contained within an indexed database.

In a further embodiment, the drive-through vehicle inspection system incorporating the optical imaging system for acquisition of information from tire sidewall markings is either a drive-over tire tread depth measurement system or a drive-through vehicle wheel alignment audit system.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 6:
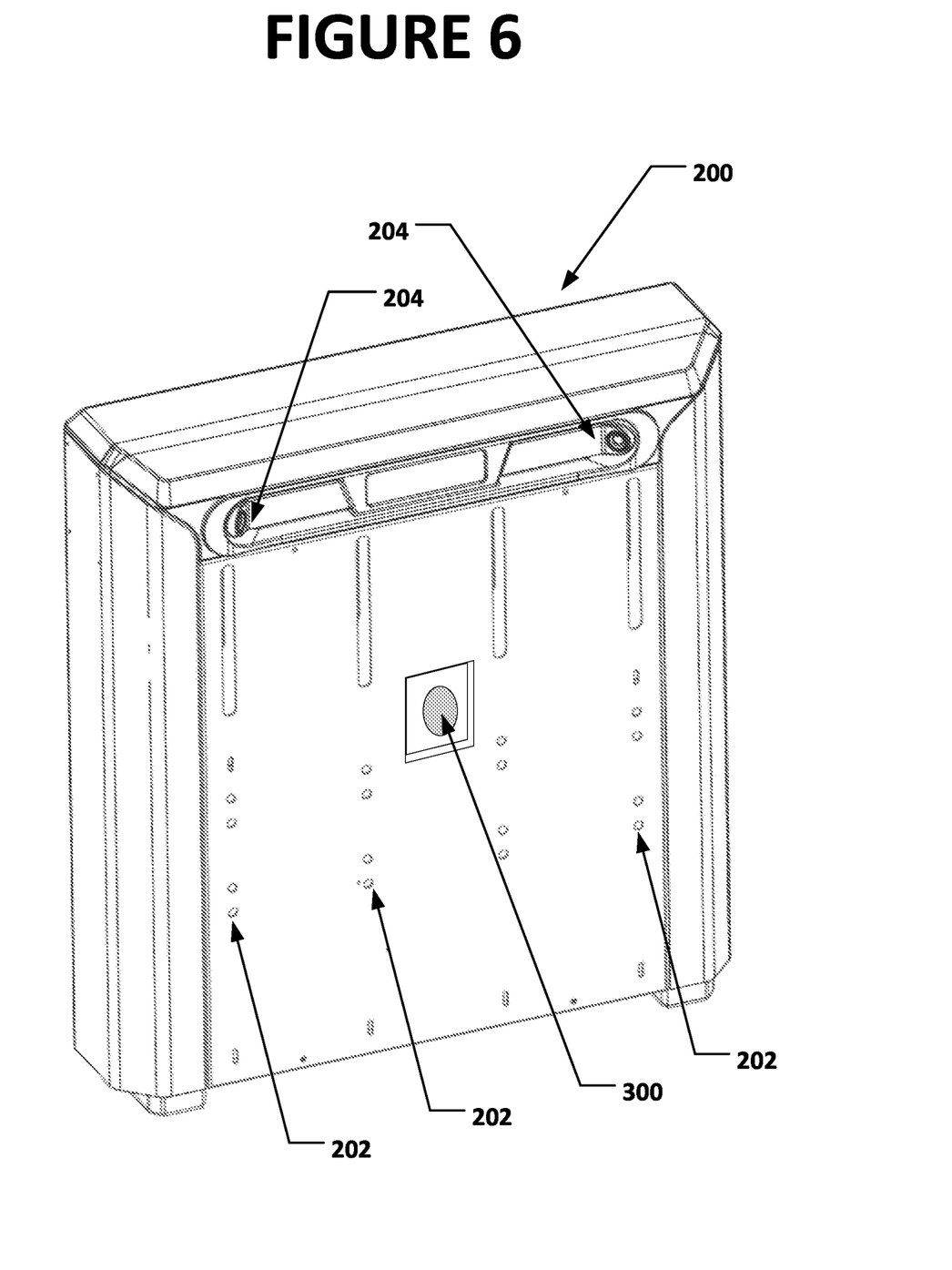
FIG. 6 is a drive-through vehicle alignment inspection sensor console configure with an optical sensor for acquiring tire sidewall images.
Figure 7:
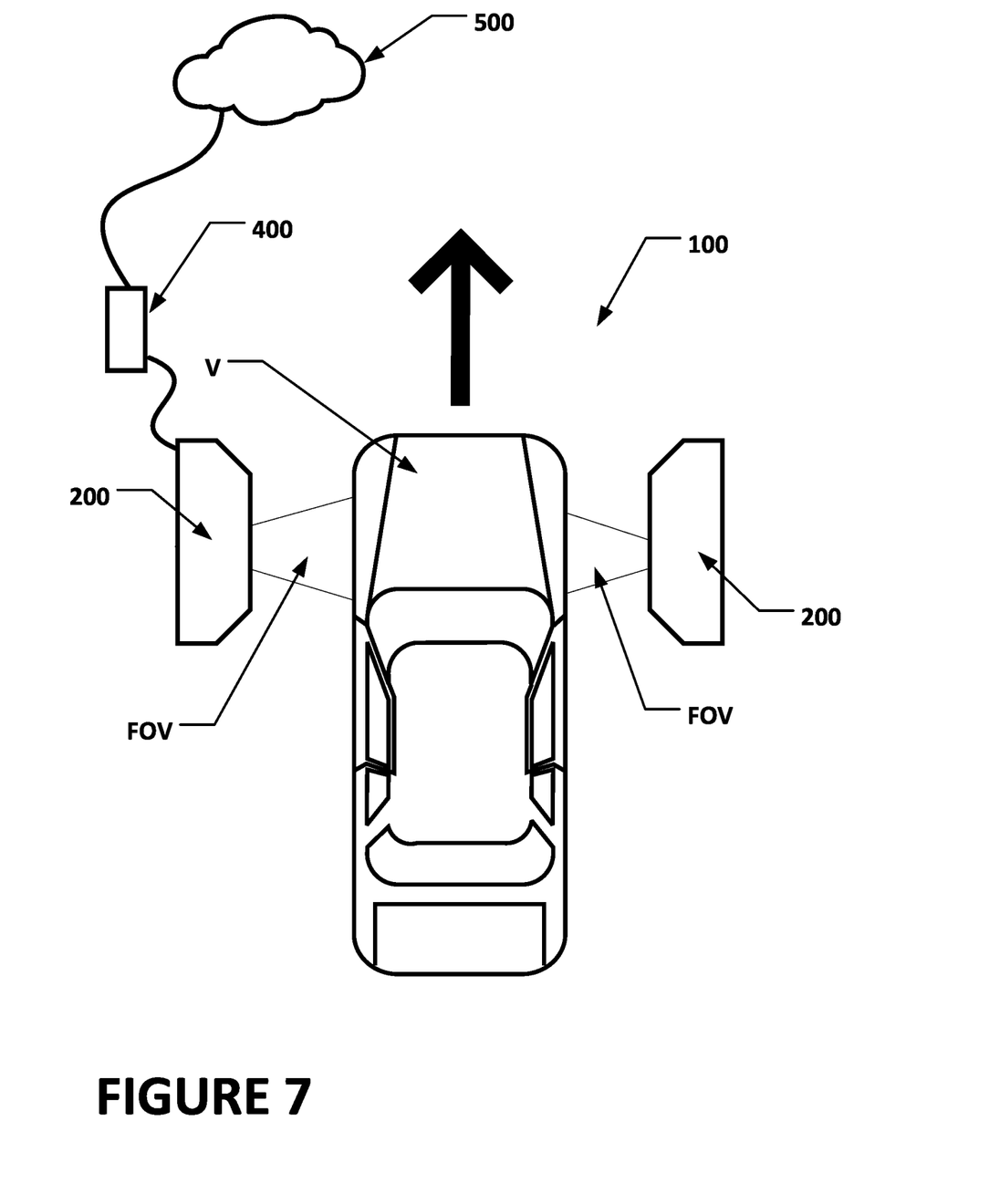
FIG. 7 is a top plan view of a vehicle passing through a drive-through vehicle alignment inspection system, illustrating the field of view for the optical sensors of FIG. 6 encompassing the vehicle front wheels.
Figure 8:
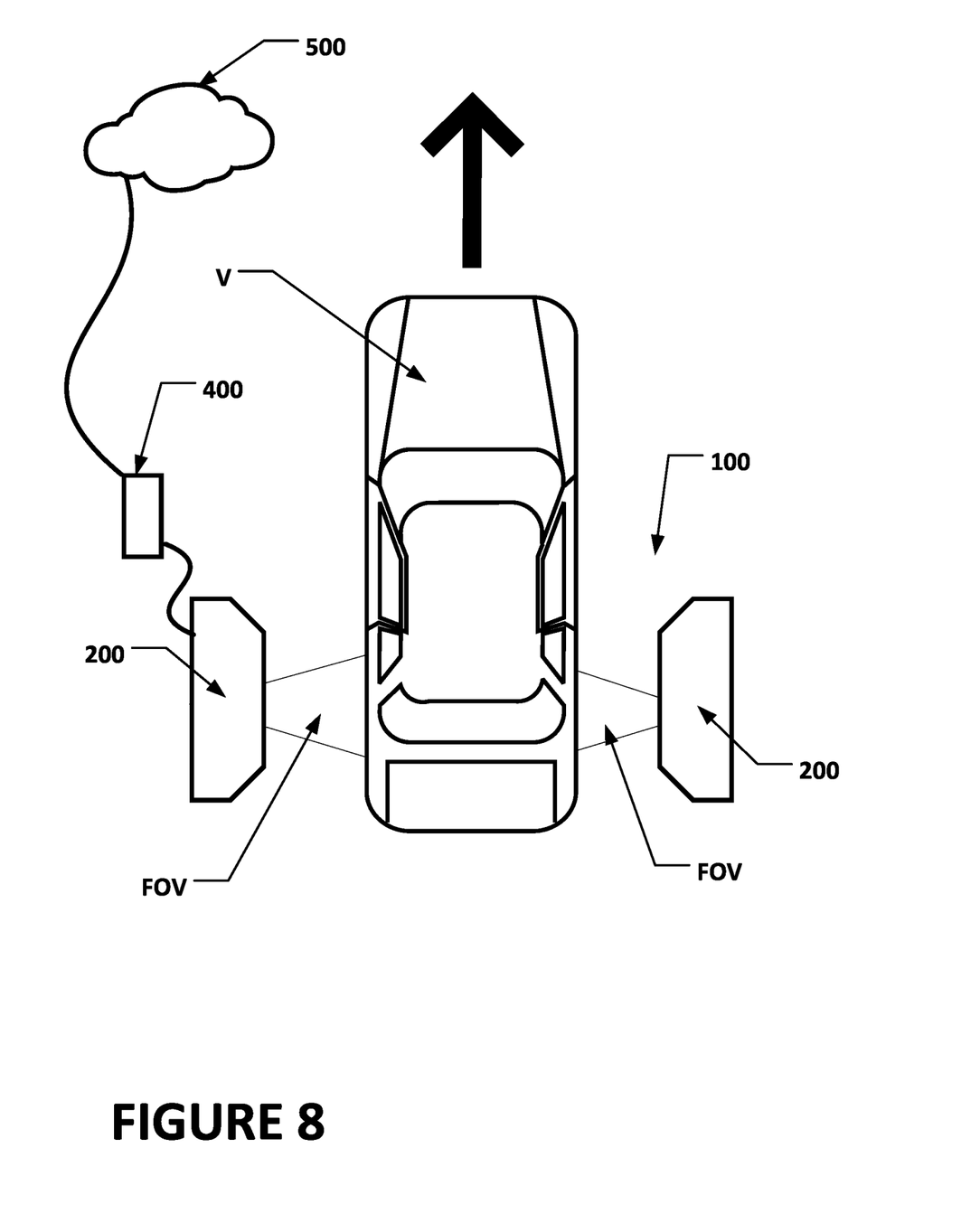
FIG. 8 is a top plan view similar to FIG. 7, illustrating the field of view for the optical sensors of FIG. 6 encompassing the vehicle rear wheels.

A drive-through vehicle inspection system 100 of the present disclosure generally defines an operative field of view or inspection region through which a moving vehicle V passes during an inspection. The inspection system is configured with suitable sensor systems to inspect or measure one or more of any of a variety of vehicle features, conditions, or properties. For example, in one embodiment illustrated in FIG. 5, the inspection system 100 is generally configured with suitable sensor modules 102 to measure tire tread depth by acquiring images and/or measurement data associated with the tread surfaces of the individual wheels WA on the vehicle, such as shown in U.S. Pat. No. 9,677,973 B1 to Carroll et al. and U.S. Patent Application Publication No. 2018/0313722 A1 to Stieff, both of which are herein incorporated by reference. In another configuration, shown in FIGS. 6-8, an inspection system 100 is configured with consoles 200 containing suitable sensor components 202 to acquire non-contact measurements associated with the spatial position and orientation of the wheel assemblies as the vehicle V moves through the inspection region, from which indications of wheel and/or axle alignments can be determined, as shown in U.S. Pat. No. 10,222,455 B1 to Stieff et al., which is herein incorporated by reference. In yet another configuration, the inspection system consoles 200 are configured with suitable sensor components 204 to capture images of the vehicle surfaces as the vehicle V moves through the field of view, in order to identify damage or establish a record of the vehicle condition. In some configurations, a drive through vehicle inspection system, such as the Quick Check Drive® system from Hunter Engineering Company is configured to perform multiple vehicle inspection functions as a vehicle V passes through an inspection region.

In each embodiment of the present disclosure, in order to facilitate identification of the vehicle and/or properties of the vehicle V such as tire or wheel assembly characteristics, the drive-through vehicle inspection system 100 is further configured with at least one optical imaging sensor 300 positioned and oriented to acquire at least one image of a tire sidewall surface associated with a wheel assembly WA of the vehicle V as it moves through the inspection region field of view FOV. Depending upon the configuration of the optical imaging sensor 300, a single image may capture substantially all of the tire sidewall and wheel rim surfaces facing the optical imaging sensor 300, or only a portion there of. In an optional configuration, the optical imaging sensor is configured to capture a sequence of tire sidewall portion images as the vehicle moves through the inspection region field of view FOV in order to obtain a sufficient number of image to capture substantially all of the tire sidewall and wheel rim surfaces facing the optical imaging sensor 300.

Figure 5:
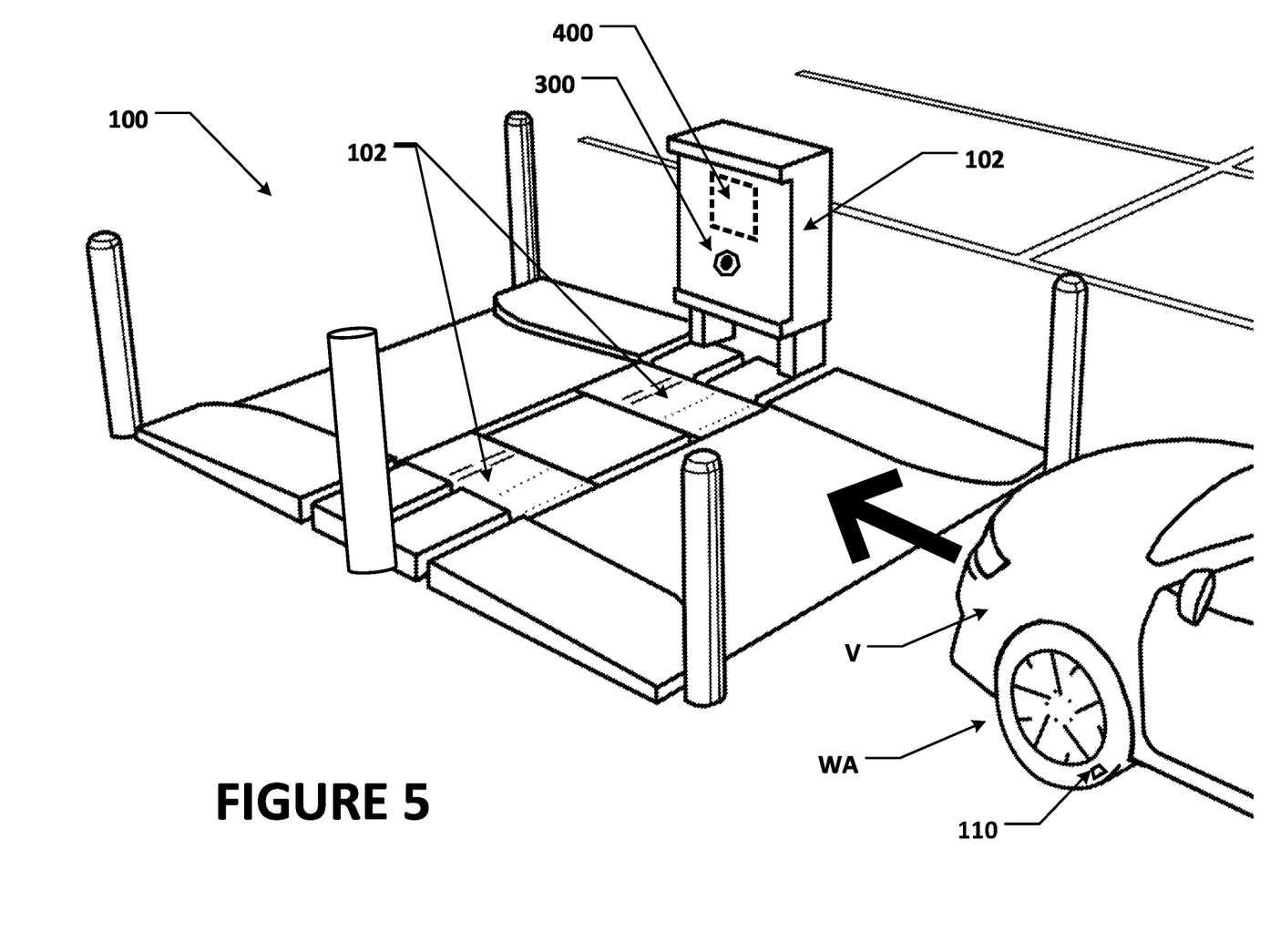
FIG. 5 is a drive-over tire tread depth measurement system configured with optical sensor for acquiring tire sidewall images.

In many applications, vehicles V undergoing inspection will have the same size tires and wheels at each end of an axle, enabling a single optical imaging system 300 to acquire relevant information for all of the tire and wheel assemblies WA on the moving vehicle by capturing images from a single side of the vehicle V, such as shown in FIG. 5. Redundant information, and/or information unique to each individual tire and wheel assembly WA on a vehicle V can be acquired by positioning a second optical imaging system 300 on the opposite side of the inspection region from the first optical imaging system, thereby capturing images of the tire and wheel assemblies WA on opposite ends of each axle as the vehicle V moves through the inspection region. Additional optical imaging systems 300 may be positioned on either side of the inspection region may be further utilized for redundancy or to capture images under differing lighting conditions and at different viewing angles.

Each optical imaging system 300 includes at least an imaging sensor configured to acquire an image of surfaces located within an observed field of view encompassing a spatial region through which a wheel assembly WA of a moving vehicle V is expected to pass. Additional components to the optical imaging 300 system may optionally include one or more sources of light for illuminating the surfaces of a passing wheel assembly WA. Preferably, the light sources are selected to provide optimal illumination for the acquisition of images by the imaging sensor, and may include visible light sources, infrared light sources, UV light sources, flash or strobe light sources, or continuous illumination sources. Activation of the light sources may be synchronized with the acquisition of images by the imaging sensor 300, or may be triggered independently, such as by a trigger mechanism responsive to a position of the moving vehicle V within the inspection region.

Figure 9:
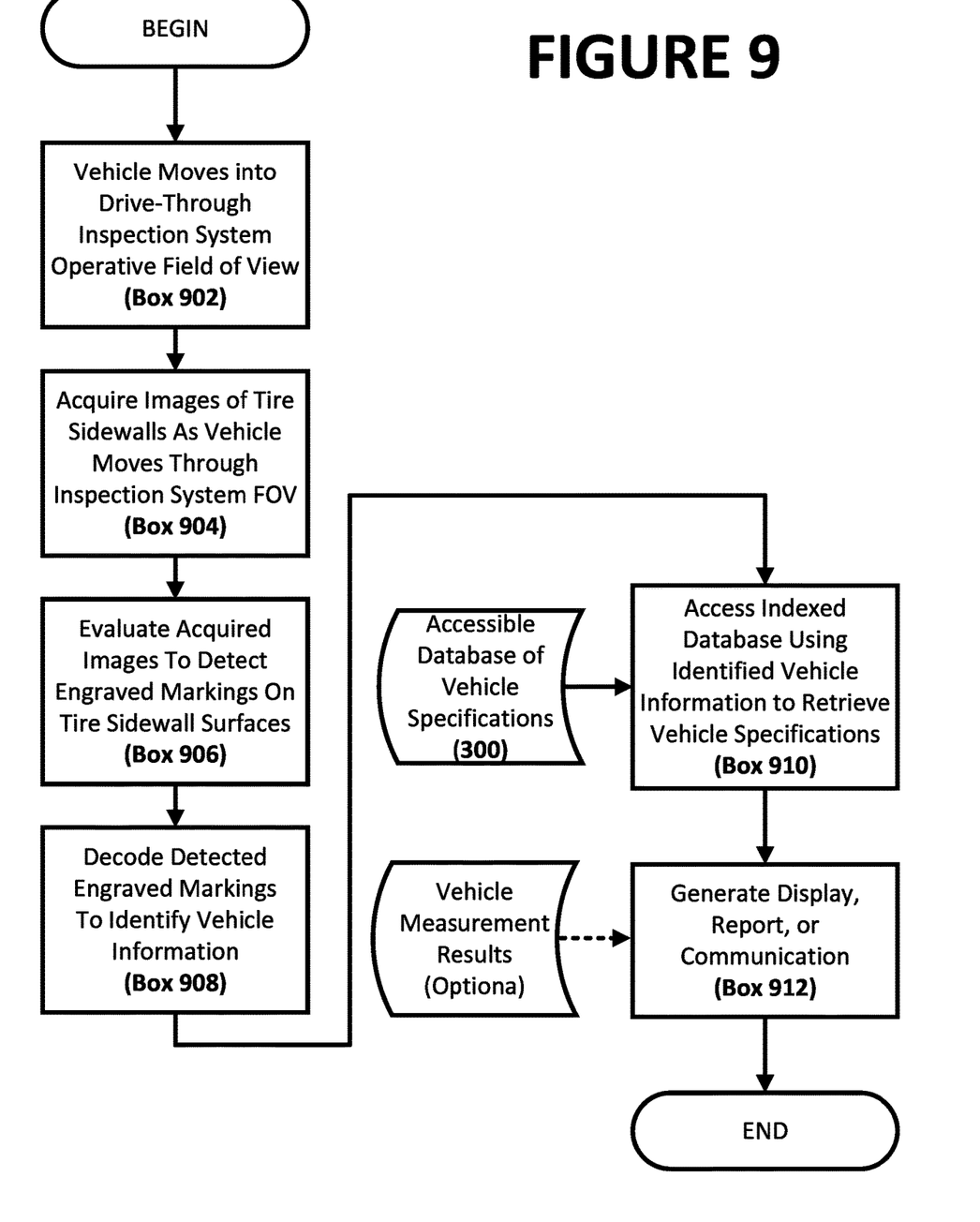
FIG. 9 is a flow diagram illustrating a method of the present disclosure for acquiring and utilizing engraved tire markings during a vehicle inspection process.

Operation of the drive-through vehicle inspection system 100 as shown in FIG. 9, is controlled by a processing system 400 operatively coupled to the various sub-systems and components. The processing system 400 is configured with software instructions to receive and process measurements acquired from the associated sensor systems, and images captured by each imaging sensor 300. As a vehicle moves through the inspection system's operative field of view (Box 902), images are acquired (Box 904) and evaluated by the processing system 400 to detect the presence of engraved markings 110 on the sidewall surfaces of imaged tires (Box 906). Engraved markings 110, such as shown in FIG. 1, consist of multiple surface regions exhibiting differing light reflective properties. Engraved markings 110 consisting of regions exhibiting a first light reflectivity in arrangement with regions exhibiting a second light reflectivity can be utilized to encode information in a digital format, using a two-dimensional code commonly known as a quick read code or QR Code® as shown in FIG. 1. The processing system 400 is configured with software instructions to evaluate detected engraved markings 100 to decode and extract the information represented therein (Box 908). The information represented by the engraved markings 110 may identify vehicle parameters associated with the vehicle V on which the wheel assembly WA is installed, such as a vehicle make, model, year of manufacture, trim level, vehicle service record, vehicle identifier, or owner identifier. Alternatively, or in combination with vehicle parameters, the information represented by the engraved markings 110 may identify tire parameters associated with the observed wheel assembly WA, such as a tire size, a wheel rim size, a tire characteristic, a tire identifier, a date (of manufacture, installation, or service), or a wheel assembly service record.

Information extracted from the engraved markings 110 on one or more of the tire sidewall surfaces of the moving vehicle may be utilized by the processing system 400 in a variety of ways. For example, information identifying vehicle-specific parameters can be used to retrieve vehicle specifications (Box 910) from an accessible database, such as a cloud-based vehicle service system 500, enabling meaningful comparison between measurements acquired by the vehicle inspection system and vehicle specifications. The extracted information may additionally be presented to an operator in the form of an electronic communication, report, or visual display, such as in combination with retrieved vehicle specifications and acquired measurements of the moving vehicle (Box 912).

Figure 2:
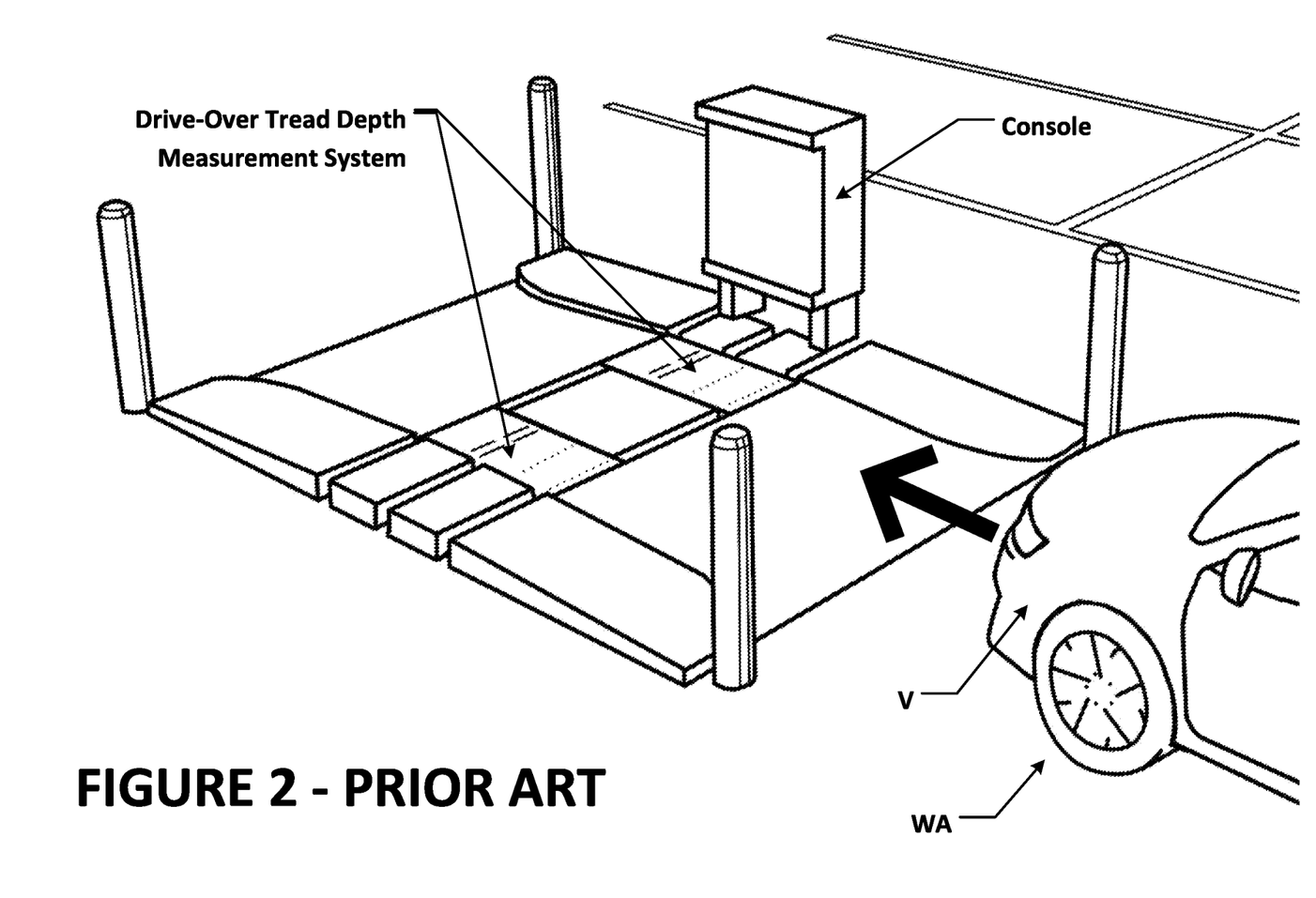
FIG. 2 is an illustration of a prior art drive-over tire tread depth measurement system.

In yet another embodiment, information extracted from the engraved markings 110 which identifies the tire by manufacturer, type, style, size, etc. is stored in association with one or more images of the tire tread surface in an accessible database, such as the cloud-based vehicle service system 500. The tire tread surface images may be acquired from additional imaging systems, or from an associated drive-over tire tread depth measurement system 102, such as shown in FIGS. 2, 3 and 5. The information stored in the accessible database 500 is subsequently utilized to train a deep-learning or artificial intelligence network. Such a deep-learning or artificial intelligence network may be in the form of a multi-layer, deep image-to-classification learning framework configured to identify tire-specific information from acquired images of tire tread surfaces. Exemplary multi-layer, deep image-to-classification learning frameworks are deep convolutional neural networks (DCNs) such as the Cognitive Toolkit™ from Microsoft®, the TensorFlow™ learning framework from Google®, and the Caffe™ learning framework from Berkley AI Research. These frameworks or networks include one or more input cells, an array of one or more interconnected layers of intermediate cells linked to the input cells, and one or more output cells receiving processed data from the intermediate cells for output. The deep image-to-classification learning framework is initially trained in a supervised learning fashion by utilizing the accessible database of tire tread surface images which have been associated with tire-specific information obtained from the engraved markings 110 on the tire sidewall surfaces and/or operator manual input. The training maps an input image of an unknown tire tread surface to a resulting output consisting of tire-specific information such as the tire manufacturer, style, size, wear, age, etc. The accessible database 500 of images is preferably dynamic, in the sense that new tire tread surface images having features already associated with known tire-specific information are periodically added to the database, providing supervised learning to increase the accuracy of the deep image-to-classification learning framework through periodic re-training. An exemplary database and cloud-based vehicle service system 500 for storing images associated with known tire-specific information is the HunterNet® cloud-based database of vehicle service and/or inspection results compiled utilizing vehicle inspection and service equipment manufactured and sold by Hunter Engineering Company® of St. Louis, Mo.

Once a tire is identified by the deep image-to-classification learning framework, additional information associated with the identified tire can be recalled from various accessible databases and interconnected memories to be utilized to carry out or complete a tire service or tread-wear inspection process. As the number of entries in the cloud-based vehicle service system 500 database increases, statistical and/or direct analysis of tire wear performance and longevity for specific tire brands, styles, and sizes in combination with various vehicles onto which they are installed can be conducted.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for acquiring vehicle information in a drive-through vehicle inspection system, comprising:
    acquiring at least one image of a tire sidewall surface from a moving vehicle passing through a field of view of said drive-through vehicle inspection system;
    evaluating said acquired at least one image to detect an engraved marking, said engraved marking representing a digital two-dimensional code on said tire sidewall surface;
    extracting, from said detected engraved marking, encoded information associated with said moving vehicle.

2. The method of claim 1 wherein evaluating said at least one image to detect said engraved marking includes identifying a first portion of said engraved marking having a first optical reflectivity, and a second portion of said engraved marking having a second optical reflectivity.

3. The method of claim 1 wherein said engraved marking encodes information associated with at least one parameter of a wheel assembly on said moving vehicle.

4. The method of claim 3 wherein said at least one parameter corresponds to at least one of a tire size, a wheel rim size, a tire characteristic, a tire identifier, a date, or a wheel assembly service record.

5. The method of claim 1 wherein said engraved marking encodes information representing at least one parameter of said moving vehicle.

6. The method of claim 5 wherein said at least one parameter includes at least one of a vehicle make, model, year of manufacture, trim level, vehicle service record, vehicle identifier, or owner identifier.

7. The method of claim 1 further including acquiring at least one image of a tire tread pattern from a wheel assembly of said moving vehicle passing through said field of view of said drive-through vehicle inspection system;
    wherein said information associated with said moving vehicle extracted from said detected engraved marking on said tire sidewall contains tire information including at least one of a tire size, a wheel rim size, a tire characteristic, a tire identifier, or a tire manufacturer;
    storing said tire information within a database in association with said image of said tire tread pattern; and
    subsequently utilizing said database to recall said tire information for tire tread pattern images matching said stored image of said tire tread pattern.

8. The method of claim 1 wherein acquiring said at least one image includes illuminating said tire sidewall surface from at least one illumination source.

9. The method of claim 1 further including acquiring tire tread depth measurement data from a plurality of tires on said vehicle passing through said drive-through vehicle inspection system; and
    generating a vehicle inspection report containing said acquired tire tread depth measurement data and said associated information extracted from at least one detected engraved marking.

10. The method of claim 1 further including acquiring measurements representative of an axle or wheel alignment for said vehicle passing through said drive-through vehicle inspection system;
    utilizing said associated information extracted from at least one detected engraved marking to recall vehicle axle or wheel alignment specification values from an accessible indexed database; and
    evaluating said acquired measurements against said recalled specification values to generate an indication of a vehicle alignment status.

11. A drive-through vehicle inspection system having an operative field of view through which a moving vehicle passes during an inspection, comprising:
    at least one sensor system configured to acquire measurements associated with said moving vehicle passing through said operative field of view;
    at least one optical imaging system configured to acquire at least one image of a tire sidewall surface associated with a wheel assembly of said moving vehicle;
    a processing system operatively coupled to receive said acquired measurements from said at least one sensor system and said at least one image from said optical imaging system, said processing system configured with software instructions to evaluate said at least one image to identify at least one engraved two-dimensional digital code on said tire sidewall surface;
    wherein said processing system is further configured with software instructions to extract data from each identified engraved two-dimensional digital code.

12. The drive-through vehicle inspection system of claim 11 wherein said processing system is further configured with software instructions to identify a vehicle parameter from said extracted data, said vehicle parameter including at least one of a vehicle make, model, year of manufacture, trim level, vehicle service record, vehicle identifier, or owner identifier.

13. The drive-through vehicle inspection system of claim 12 wherein said processing system is further configured with software instructions to utilize said identified vehicle parameter to retrieve vehicle-specific data from an indexed database of vehicle records, and to utilize said retrieved vehicle-specific data together with said acquired measurements to generate a vehicle inspection report.

14. The drive-through vehicle inspection system of claim 11 wherein said processing system is configured with software instructions to identify said engraved two-dimensional digital code on said tire sidewall surface by locating tire sidewall markings within said acquired at least one image consisting of regions having a first optical reflectivity and regions having a second optical reflectivity which differs from said first optical reflectivity.

15. The drive-through vehicle inspection system of claim 11 further including an illumination source oriented to illuminate said tire sidewall surface during acquisition of said at least one image.

16. The drive-through vehicle inspection system of claim 11 wherein said sensor system is configured to acquire data representative of tire tread depths and/or wheel or axle alignments from said moving vehicle.

17. The drive-through vehicle inspection system of claim 11 wherein said processing system is further configured with software instructions to identify a wheel assembly parameter from said extracted data, said wheel assembly parameter including at least one of a tire size, a wheel rim size, a tire characteristic, a tire identifier, a date, or a wheel assembly service record.

* * * * *